Figure 1:
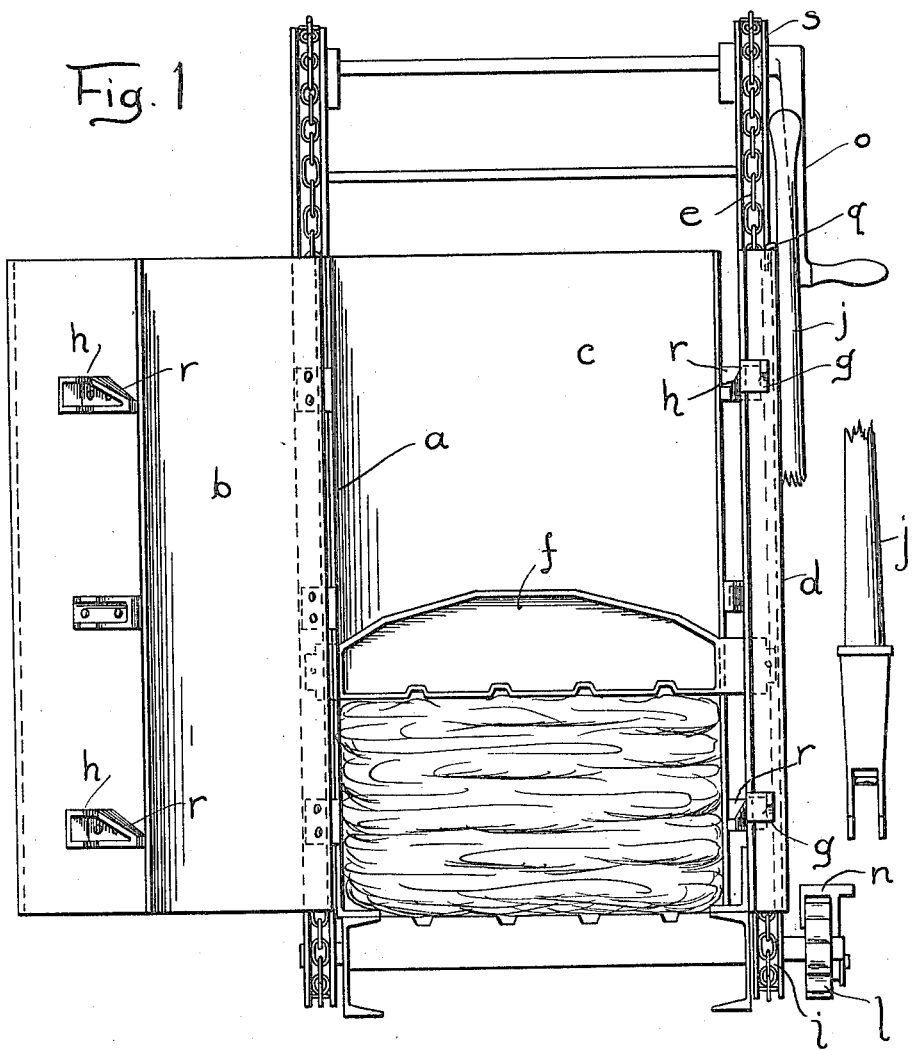

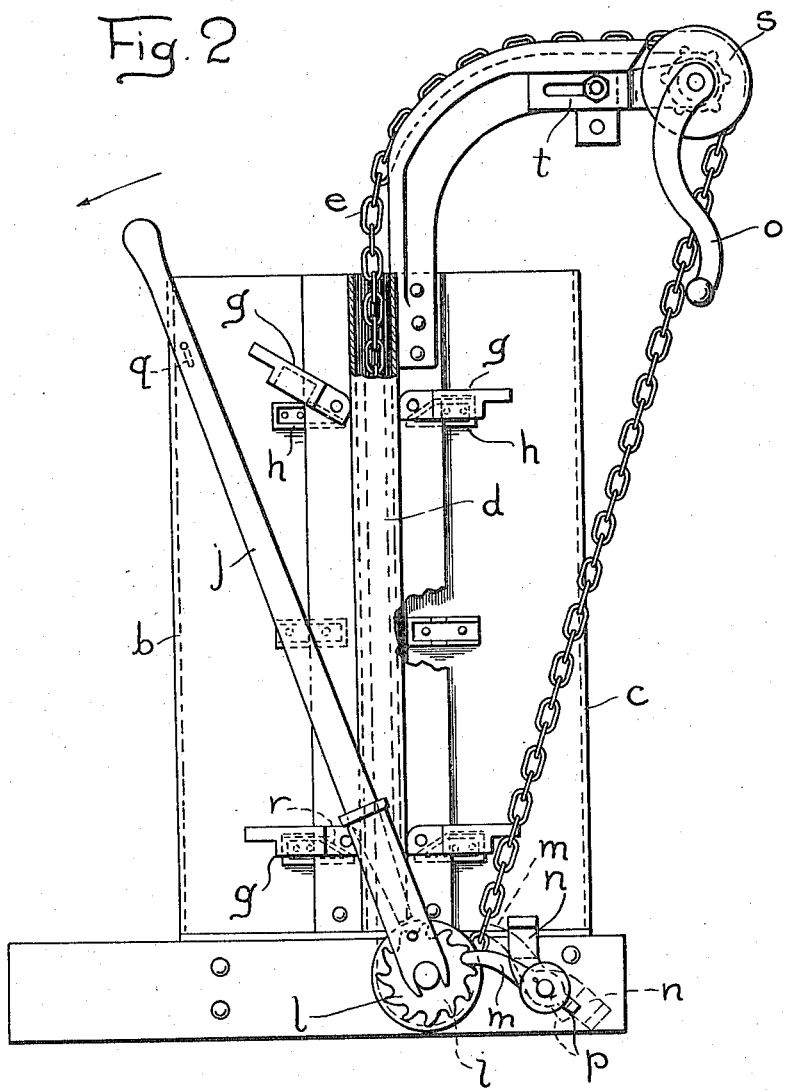

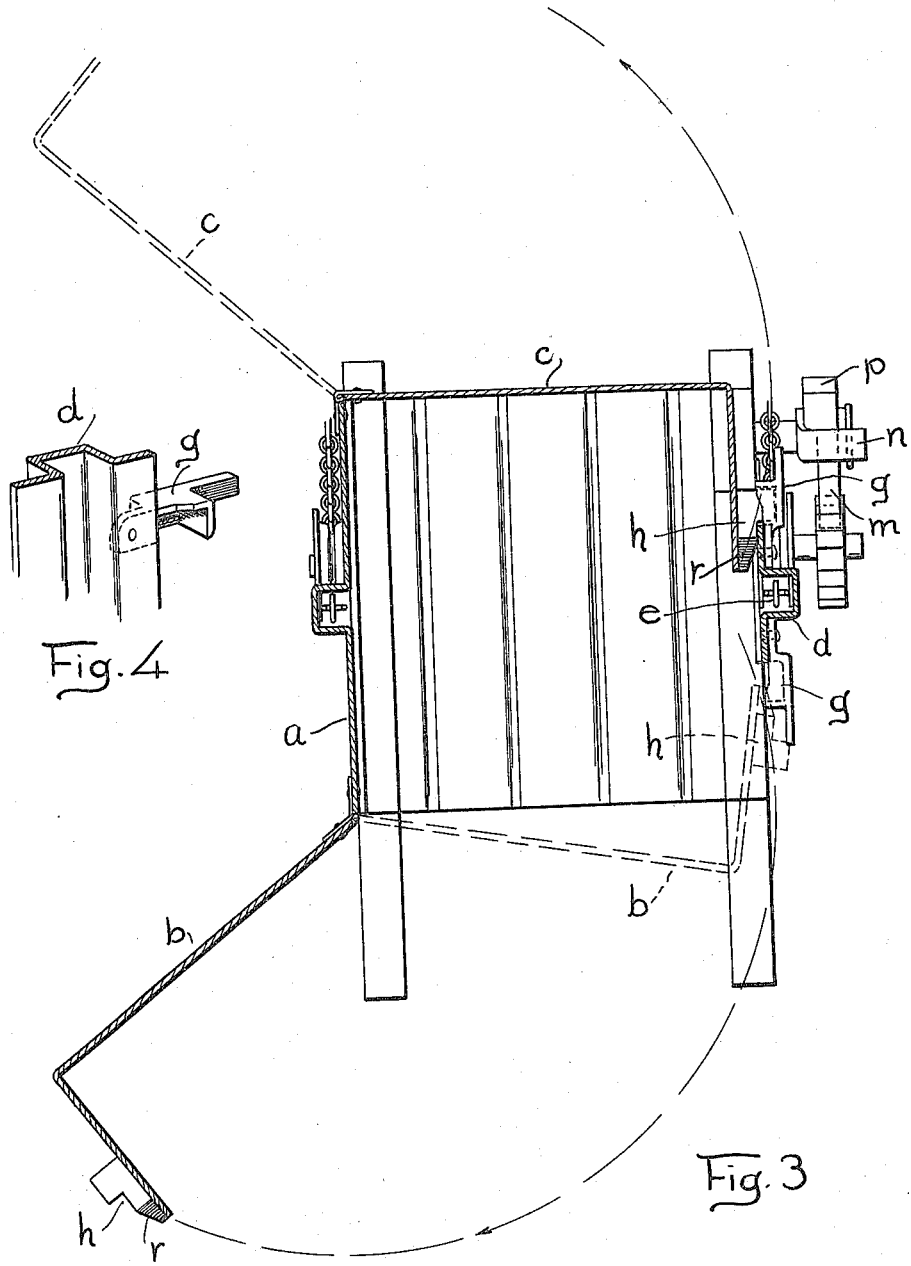

UNITED STATES PATENT OFFICE.

PERCY WAREHAM, OF SHARON, PENNSYLVANIA.

BALER.

1,162,833.  Specification of Letters Patent.  Patented Dec. 7, 1915.

Application filed February 23, 1915. Serial No. 9,769.

*To all whom it may concern:*

Be it known that I, PERCY WAREHAM, a citizen of the United States, residing at Sharon, county of Mercer, State of Pennsylvania, have invented a certain new and useful Improvement in Balers, and declare the following to be a full, clear, and exact description of the same, such as will enable others skilled in the art to which it pertains to make and use the same, reference being had to the accompanying drawings, which form a part of this specification.

This invention relates to balers and has for its object a baler so constructed that after the material therein is firmly compressed three of the sides of the bale may be exposed for the purpose of wiring the bale and inclosing it in burlap or other covering if necessary, and to keep the finished bale from sticking or binding when removing it from baler.

The casing of the baler is constructed of one permanent or fixed side and two movable casing portions which are arranged to automatically lock to an upright support and form substantially the other three sides. The locking devices also act as spacers for a purpose hereinafter to be described.

In the drawings,—Figure 1 is a front view of the baler. Fig. 2 is a side view of the baler with some of the parts broken away. Fig. 3 is a horizontal cross section of the baler showing one of the swinging casing portions closed and the other swinging casing portion partly open. Fig. 4 is a detail in perspective of one of the upright supports or chain guides showing one of the catches.

The baler with follower and chains running on quadrants, has already been patented to me, in Patent #1,058,281, dated April 8th, 1913, and I do not claim anything thereon, and it is unnecessary to describe it. In my present construction I have re-arranged the casings of the baler, whereby the bale is better exposed, for wiring and wrapping and to eliminate all possibilities of the finished bale binding or sticking in the baler, in removing the bale from the baler. Instead of two or three fixed sides for the casing I now employ only a single fixed side, this is the side designated $a$. Hinged to the fixed side are a pair of movable casing portions $b$ and $c$. Each one of these casing portions $b$ and $c$ comprises one complete side—in the casing portion $b$ the front, and in the casing portion $c$ the back—plus substantially one-half of the third side. When these two movable casing portions are closed the two half portions of the third side lock with the chain guide or upright support $d$ to form the third side. This upright support $d$ comprises a channel bar, having a channel which acts as a guide for the chain $e$ which carries the follower $f$. On the outside of the flanges of the right upright support $d$ are pivoted a plurality of swinging catches $g$. The tails of these catches are adapted to engage with the channel portion of the upright support channel bar $d$ so that they rest in a horizontal position. Spacing blocks $h$ are substantially fastened to the free ends of the swinging casing portions $b$ and $c$. Their forward ends are beveled at $r$ so that when swung toward the upright support $d$ the spacing blocks $h$ strike under the edge of the catches $g$ and by reason of the bevel character of the front end lift the catches $g$ until the catch $g$ drops over the rear of the spacing block $h$. This forms an automatic lock for the swinging casing portions. When it is desired to release the moving casing portions $b$ and $c$, the catches $g$ are grasped by the handles and turned to upright position where they will stand without further aid by reason of the long edge of the catch $g$ engaging against the side of the channel of the channel bar upright support $d$. The spacing blocks $h$ act as spacers as stated in the introduction. In this they accomplish very useful purposes in connection with the casing opening up for a three side exposure to allow wrapping in burlap when required and to eliminate all chances of the finished bale sticking or binding in the baler when removing the bale. Referring to Figs. 1 and 3, it will be seen that the spacing blocks $h$ space the baler casing from the right upright support $d$. This is important for it allows the passing of the wire and the burlap between the bale and the upright support $d$ when it is being bound and wrapped after the swinging casing portions $b$ and $c$ have been swung open and the absolute freedom from the finished bale sticking in the baler when removing.

The endless chain $e$ which operates the follower is operated to pull the follower down by the rotation of the pinion $i$. This is accomplished by use of the special form of lever $j$ shown in Figs. 1 and 2, and engaging with a ratchet wheel $l$ fast to the pinion $i$. Back rotation of the ratchet wheel is prevented by a novel form of pawl m. The same pin that pivots the pawl m pivots a weight n which in the position shown in the full lines of Fig. 2 yieldingly keeps the pawl on the ratchet teeth, and when swung to the position shown in the dotted lines of Fig. 2 engages with the tail p of the pawl and keeps the pawl out of engagement with the ratchet teeth, as shown in the dotted lines of this figure so that the pinion may rotate in the opposite direction for the purpose of lifting the follower f after the bale is finished. The opposite rotation of the chain is effected by the hand crank o.

The lever j is provided with an L-shaped hook q that may rotate slightly in the lever so that when the hook g is adjacent to the top of the guide or upright support d the hook may be turned into the top edge of the upright support d so as to hold the lever from dropping down.

The chain pulley s may be adjusted along the bracket to give or take up slack by reason of being carried on a block t having a slot and bolt connection with the upper end of the bracket.

What I claim is:

1. In a baler, the combination of a casing comprising a fixed side and two casing portions hinged to the fixed side, each casing portion comprising one side plus substantially half of the third side.

2. In a baler, a casing comprising a fixed side, a pair of movable casing portions hinged to the fixed side, each comprising one side plus substantially half of the third side, and means for locking the two movable portions to the upright support.

3. In a baler, a casing comprising a fixed side, a pair of movable casing portions hinged to the fixed side, and each comprising one side plus substantialy half of the other side, and means for automatically locking the two movable casing portions to the upright support when they are swung closed.

4. In a baler, a casing comprising a fixed side, a pair of movable casing portions hinged to the fixed side, each comprising one side plus substantially half of the third side, an upright support adjacent to the third side of the baler, portions of locking devices on said upright support, and portions of locking devices on the free ends of the two movable casing portions for locking with the locking portions on the upright support.

5. In a baler, a casing comprising a fixed side, a pair of movable casing portions hinged to the fixed side and comprising each a side substantially half of the third side, an upright support on the third side of the baler, catches on the upright support, and spacing blocks on the free ends of the movable casing portions for engaging with the catches to lock the two movable casing portions to the upright support.

6. In a baler, a casing comprising a fixed side, a pair of movable casing portions hinged to the fixed side and each comprising one side plus substantially half of the third side, an upright support, pivoted catches on the upright support and beveled spacing blocks on the free ends of the movable casing portions for automatically locking with the swinging catches on the upright support.

7. In a baler, a casing comprising a fixed side, a pair of swinging casing portions hinged to the fixed side, and each consisting of one side plus substantially one-half of the third side, an upright support, and means for spacing the portions which go to make up the third side from the upright support when the baler casing is closed.

8. In a baler, a casing comprising a fixed side, a pair of movable casing portions hinged to the fixed side and comprising each a side plus substantially one-half of the third side, an upright support, and locking devices for locking the movable casing portions to the upright support and for spacing the third side of the casing from the upright support when the casing is closed.

9. In a baler, the combination of a follower, means for operating it, a casing comprising a fixed side, a pair of movable casing portions comprising each one side plus substantially half of the third side, an upright support, catches located on the upright support, and spacing blocks on the free ends of the moving casing portions for both engaging with the catches on the upright support and spacing the third side from the upright support so finished bale will not stick or bind in baler when removing, and leaving a substantial space between the third side ends of the movable casing portions for the free movement vertically of the aforesaid follower in pursuance of the duties required thereof, substantially and as described.

10. In a baler, a casing comprising a fixed side, a pair of movable casing portions comprising each one side plus substantially one-half of the third side, an upright support, catches located on the upright support, and spacing blocks on the free ends of the moving casing portions for both engaging with the catches on the upright support and spacing the third side from the upright support.

In testimony whereof, I sign this specification in the presence of two witnesses.

PERCY WAREHAM.

Witnesses:
Mrs. PERCY WAREHAM,
MARY ADAMS.

Copies of this patent may be obtained for five cents each, by addressing the "Commissioner of Patents, Washington, D. C."